(12) United States Patent
Kannan et al.

(10) Patent No.: US 9,946,971 B1
(45) Date of Patent: Apr. 17, 2018

(54) METHOD FOR THE MANAGEMENT OF ARTIFACTS IN KNOWLEDGE ECOSYSTEMS

(71) Applicant: Massachusetts Mutual Life Insurance Company, Springfield, MA (US)

(72) Inventors: Gopika Kannan, West Hartford, CT (US); Jennifer Fabrizi, Amherst, MA (US); Robert Polkowski, Boston, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 635 days.

(21) Appl. No.: 14/572,124

(22) Filed: Dec. 16, 2014

Related U.S. Application Data (60) Provisional application No. 61/918,981, filed on Dec. 20, 2013.

(51) Int. Cl.
  *G06F 17/00* (2006.01)
  *G06N 5/02* (2006.01)
  *G06F 17/30* (2006.01)

(52) U.S. Cl.
  CPC ......... *G06N 5/022* (2013.01); *G06F 17/3053* (2013.01); *G06F 17/30289* (2013.01); *G06F 17/30598* (2013.01)

(58) Field of Classification Search
  CPC ........ G06Q 10/06; G06Q 10/10; G06Q 30/02; G06F 17/30
  USPC .......................................................... 706/50
  See application file for complete search history.

(56) References Cited

U.S. PATENT DOCUMENTS

| | | | | |
|---|---|---|---|---|
| 7,716,077 B1 * | 5/2010 | Mikurak | ................ | G06Q 10/06 705/7.12 |
| 7,860,706 B2 * | 12/2010 | Abir | .................... | G06F 17/2872 704/4 |
| 7,957,991 B2 * | 6/2011 | Mikurak | ................ | G06Q 10/06 705/7.11 |

(Continued)

OTHER PUBLICATIONS

Clinical named entity recognition: Challenges and opportunities Srinivasa Rao Kundeti; J. Vijayananda; Srikanth Mujjiga; M. Kalyan 2016 IEEE International Conference on Big Data (Big Data) Year: 2016 pp. 1937-1945 IEEE Conference Publications.*

(Continued)

*Primary Examiner* — Michael B Holmes
(74) *Attorney, Agent, or Firm* — Eric L. Sophir; Dentons US LLP (57) ABSTRACT

A method for the management of artifacts in knowledge ecosystems is disclosed. The management of artifacts may be performed through the interaction of project participants with a computing device which may display a project repository interface of a software module within a knowledge ecosystem. The method may include the process to retrieve an artifact from a knowledge base to store in the project repository, and the process to store a new artifact in the knowledge base. Moreover, the method may include a process for associating a retention policy, a quality rank and suitable categories and tags to each artifact stored in the knowledge base, which may facilitate the selection of a suitable artifact according to the project requirements. As a result, the method for the management of artifacts may allow leveraging human expertise, saving human efforts, improving decision-making and fostering innovation.

26 Claims, 5 Drawing Sheets

(56) References Cited

U.S. PATENT DOCUMENTS

| | | | | |
|---|---|---|---|---|
| 8,032,409 | B1* | 10/2011 | Mikurak | G06Q 10/00 705/14.39 |
| 8,271,336 | B2* | 9/2012 | Mikurak | G06Q 10/087 705/22 |
| 8,468,244 | B2* | 6/2013 | Redlich | G06Q 10/06 705/50 |
| 8,560,366 | B2* | 10/2013 | Mikurak | G06Q 10/06 705/7.12 |
| 8,732,023 | B2* | 5/2014 | Mikurak | G06Q 10/087 705/22 |
| 8,818,789 | B2* | 8/2014 | Abir | G06F 17/2872 704/10 |
| 8,874,431 | B2* | 10/2014 | Abir | G06F 17/2809 704/1 |
| 8,880,392 | B2* | 11/2014 | Abir | G06F 17/2872 704/10 |
| 9,456,086 | B1* | 9/2016 | Wu | H04M 3/5233 |
| 9,684,698 | B1* | 6/2017 | Kannan | G06F 17/30554 |
| 2001/0054032 | A1 | 12/2001 | Goldman et al. | |
| 2003/0023600 | A1* | 1/2003 | Nagamura | G06F 17/30713 |
| 2004/0006566 | A1 | 1/2004 | Taylor et al. | |
| 2005/0119959 | A1* | 6/2005 | Eder | G06Q 10/04 705/36 R |
| 2007/0136429 | A1 | 6/2007 | Fine et al. | |
| 2008/0168135 | A1* | 7/2008 | Redlich | G06Q 10/10 709/204 |
| 2008/0301105 | A1 | 12/2008 | Chen et al. | |
| 2009/0112678 | A1* | 4/2009 | Luzardo | G06N 5/02 705/7.38 |
| 2009/0307129 | A1 | 12/2009 | Matkowsky et al. | |
| 2010/0088139 | A1* | 4/2010 | Rahi | G06Q 10/0637 705/7.36 |
| 2010/0241698 | A1* | 9/2010 | Hillerbrand | H04L 41/00 709/203 |
| 2010/0306204 | A1* | 12/2010 | Chitiveli | G06F 17/3071 707/752 |
| 2010/0325214 | A1 | 12/2010 | Gupta | |
| 2010/0332428 | A1* | 12/2010 | McHenry | G06F 17/3071 706/12 |
| 2013/0007036 | A1* | 1/2013 | Childs | G06F 17/30997 707/769 |
| 2013/0086495 | A1 | 4/2013 | Guzansky et al. | |
| 2013/0091456 | A1 | 4/2013 | Sherman et al. | |
| 2013/0110641 | A1 | 5/2013 | Ormont et al. | |
| 2013/0132389 | A1* | 5/2013 | Majidian | G06F 17/30622 707/736 |
| 2013/0166530 | A1* | 6/2013 | Pilat | G06F 17/30873 707/708 |
| 2014/0075004 | A1 | 3/2014 | Van Dusen et al. | |
| 2014/0081685 | A1* | 3/2014 | Thacker | G06Q 10/06 705/7.12 |

OTHER PUBLICATIONS

An approach to mining association rules in horizontally distributed databases with anonymous ID assignment Manali Rajeev Raut; Hemlata Dakhore 2015 Global Conference on Communication Technologies (GCCT) Year: 2015 pp. 391-396 IEEE Conference Publications.*

Analysis and prediction of natural disaster using spatial data mining technique J. Refonaa; M. Lakshmi; V. Vivek 2015 International Conference on Circuits, Power and Computing Technologies [ICCPCT-2015] Year: 2015 pp. 1-6 IEEE Conference Publications.*

Ge(o)Lo(cator): Geographic Information Extraction from Unstructured Text Data and Web Documents Paolo Nesi; Gianni Pantaleo; Marco Tenti 2014 9th International Workshop on Semantic and Social Media Adaptation and Personalization Year: 2014 pp. 60-65 IEEE Conference Publications.*

* cited by examiner

METHOD FOR THE MANAGEMENT OF ARTIFACTS IN KNOWLEDGE ECOSYSTEMS

CROSS-REFERENCE TO RELATED APPLICATIONS

This application claims priority to U.S. Provisional Patent Application Ser. No. 61/918,981, entitled "Method for the Management of Artifacts in Knowledge Ecosystems," filed Dec. 20, 2013, which is hereby incorporated by reference in its entirety.

TECHNICAL FIELD

The present disclosure relates generally to knowledge management systems, and more particularly, to methods for the management of artifacts in knowledge ecosystems.

BACKGROUND

In a project execution, multiple project participants may contribute to create new knowledge by developing new artifacts to implement. Typical collaborative approaches to develop new artifacts may include an in-person conversation, electronic mails, telephone conversations, and discussion forums. However, most organizations may take little advantage on the similarities of the deliverables between projects, by conducting each project from the beginning all over, which may cause the knowledge that may have been created during each project execution to be lost due to the lack of a method to store and manage the artifacts. Failure to transfer this knowledge to future projects may lead to redundant activity and lower project performance.

For the foregoing reasons, there may be a need for a method for the management of artifacts in knowledge ecosystems, which may allow the knowledge that may have been created during a specific project execution, to be stored in a knowledge base and to be available for retrieval during the execution of future projects, leveraging human expertise, and improving the knowledge flow management.

SUMMARY

The present disclosure describes a method for the management of artifacts in a knowledge ecosystem.

In one embodiment, a computer-implemented method comprises receiving, by a computer, from a client device a request to store a new artifact and the new artifact from a client device; categorizing, by the computer, the new artifact according to a selection of artifact in the upload request; associating, by the computer, additional information defined in the upload request with the new artifact; storing, by the computer, the new artifact into an artifact database storing one or more artifacts; automatically associating, by the computer, the new artifact with one or more attributes according to additional information; automatically associating, by the computer, the one or more attributes with one or more tags; upon automatically associating the one or more attributes, deriving, by the computer, knowledge from the new artifact using the one or more tags, the one or more attributes, and the additional information; and storing, by the computer, the knowledge derived from the new artifact in a knowledge base.

In another embodiment, a computer-implemented method comprises receiving, by a computer, from a client device a request to retrieve an artifact related to a project stored in a database, wherein the request comprises a list of one or more attributes associated with the artifact; identifying, by the computer, a set of candidate artifacts stored in the database satisfying the retrieval request; upon identifying the set of candidate artifacts, identifying, by the computer, from the one or more candidate artifacts a set of one or more matching artifacts associated with knowledge related to the project; and storing, by the computer, the set of artifacts in a project repository that is associated with the project.

In yet another embodiment, a computer-implemented method comprises storing, by the computer, a new artifact in a database storing one or more artifacts, wherein the new artifact is associated with knowledge; receiving, by the computer, one or more quality evaluations for the new artifact, wherein a quality evaluation evaluates the knowledge associated with the new artifact; calculating, by the computer, a quality score for the new artifact using the one or more quality evaluations; and automatically ranking, by the computer, each of the one or more artifacts stored in the database based on the quality score associated with each of the artifacts.

In still yet another embodiment, a system comprises an artifact database storing one or more artifacts associated with one or more artifact attributes, wherein the one or more artifact attributes are each associated with a tag; a knowledge base storing knowledge associated with each of the one or more artifacts; a project repository storing one or more projects implementing a set of artifacts that are related to a project; a management processor operating a project repository interface and configured to receive a request from a project repository interface; and a client device interacting with the project repository interface.

The exemplary embodiments described herein are directed to improving the efficiency of processing knowledge information. The systems and methods use a specially-programmed computer system that has the capability to perform the complex computations and automated functionality that cannot be reasonably performed by a person. The computations and functionality are envisioned to be performed by a non-human system, including hardware, software, and/or firmware. The computations and functionality cannot be performed by a generic computer, but rather a specially-programmed computer that is configured to perform the complex computations and functionality described herein. The techniques and processes described herein may also improve the efficiency of the specially-programmed computer by performing discrete tasks that can more optimally process data.

Numerous other aspects, features and benefits of the present disclosure may be made apparent from the following detailed description taken together with the drawing figures.

DEFINITIONS

As used here, the following terms may have the following definitions:

"Template" refers to a standardized version of a document without information or data that can vary between projects. The purpose of a template is to provide a standardized way to report information specific to a project.

"Artifact" refers to any instance of a document including information of use in one or more projects. Types of artifacts may include project deliverables, project groundwork, and reference documents. Project deliverables may include documents which may be created and provided as a result of the completion of one or more stages of a project such as business requirements, test plans, test cases, project charter, and project scope. Project groundwork may include documents created to support the analysis during project execution, including diagrams, spreadsheets and questionnaires, among others. Reference documents may describe suitable approaches for implementing one or more artifacts according to the knowledge required by the project. An artifact is not necessarily derived from a template. It may be an original document created independently of any template, but that will support a project by containing relevant information.

"Attribute" refers to one or more characteristics that describe one or more aspects of an object, project, document, or participant.

"Knowledge" refers to information, acquired, or derived by one or more participants in one or more projects for use in one or more other projects.

"Knowledge Base" refers to a collection of knowledge content saved in an electronic storage system and that may be later retrieved for implementation in future projects.

"Knowledge Ecosystem" refers to people creating knowledge through networks of collaboration that may be supported by a technology network of knowledge bases and communication links.

"Knowledge Based Assignment Module" refers to a module which may be part of a knowledge ecosystem which is responsible to gather necessary information to perform an optimal assignment of a set of employees to a set of projects.

"Knowledge Content" refers to the work output produced by the members of a knowledge ecosystem, where this content may have a life cycle that matures from tribal knowledge to conventional wisdom through the structure of the ecosystem. Knowledge content may be in the form of a piece of documentation such as memos, notes, emails, directories, articles, white papers, and case studies, among others, where this documentation may be relevant to execute tasks of interest within an organization.

"Knowledge Management" refers to the process of acquiring, organizing, storing, sharing and using knowledge by organizations or individuals.

"Knowledge Map" refers to a diagram used for visualizing flow of knowledge and duties before, during and after a project execution.

"Project Repository" refers to an electronic storage system that may save a collection of artifacts implemented in a specific project and available for the users through the project repository interface.

"Tag" refers to metadata representing attributes of an artifact.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

The exemplary embodiments described herein are directed to improving the efficiency of processing knowledge information. The systems and methods use a specially-programmed computer system that has the capability to perform the complex computations and automated functionality that cannot be reasonably performed by a person. The computations and functionality are envisioned to be performed by a non-human system, including hardware, software, and/or firmware. The computations and functionality cannot be performed by a generic computer, but rather a specially-programmed computer that is configured to perform the complex computations and functionality described herein. The techniques and processes described herein may also improve the efficiency of the specially-programmed computer by performing discrete tasks that can more optimally process data.

According to one embodiment, the knowledge ecosystem may include a software module dedicated to manage a collection of artifacts stored in a database and to manage the knowledge associated to each artifact, which may be stored in a knowledge base. The software module may perform the management of artifacts through the knowledge management system, which may process the complete flow of information within the knowledge ecosystem. A computing device may display a project repository interface of the software module, which may be configured to receive requests from one or more project participants, and this project repository interface may show a list of all the artifacts implemented in a specific project and may include an option to upload and an option to retrieve one or more artifacts.

According to a another embodiment, the method for the management of artifacts may include a process for retrieving an available artifact from the database according to its associated knowledge from the knowledge base and according to the project requirements. The artifacts which may have been retrieved for the project may be stored in the project repository and may be displayed to every project participant through the project repository interface on the project participant's device.

In a further embodiment, the method for the management of artifacts may include a process for uploading and storing a new artifact or a new version of an already stored artifact in the database, and subsequently store its associated knowledge in the knowledge base. The process for uploading and storing the new artifact may include a step for associating suitable categories and tags to each artifact.

In yet another embodiment, the method for the management of artifacts may include a process for assigning a retention policy and a quality rank to the information presented by each artifact, which may facilitate the process of retrieving suitable artifacts according to the requirements of a specific project.

The method for the management of artifacts may allow the implementation of appropriate artifacts, which may be retrieved through suitable categories and tags associated to one or more artifacts, according to each project requirements. Additionally, the method for the management of artifacts may leverage human expertise, save human efforts, improve decision-making, and foster innovation, while using standardized means for executing any project.

Figure 1:
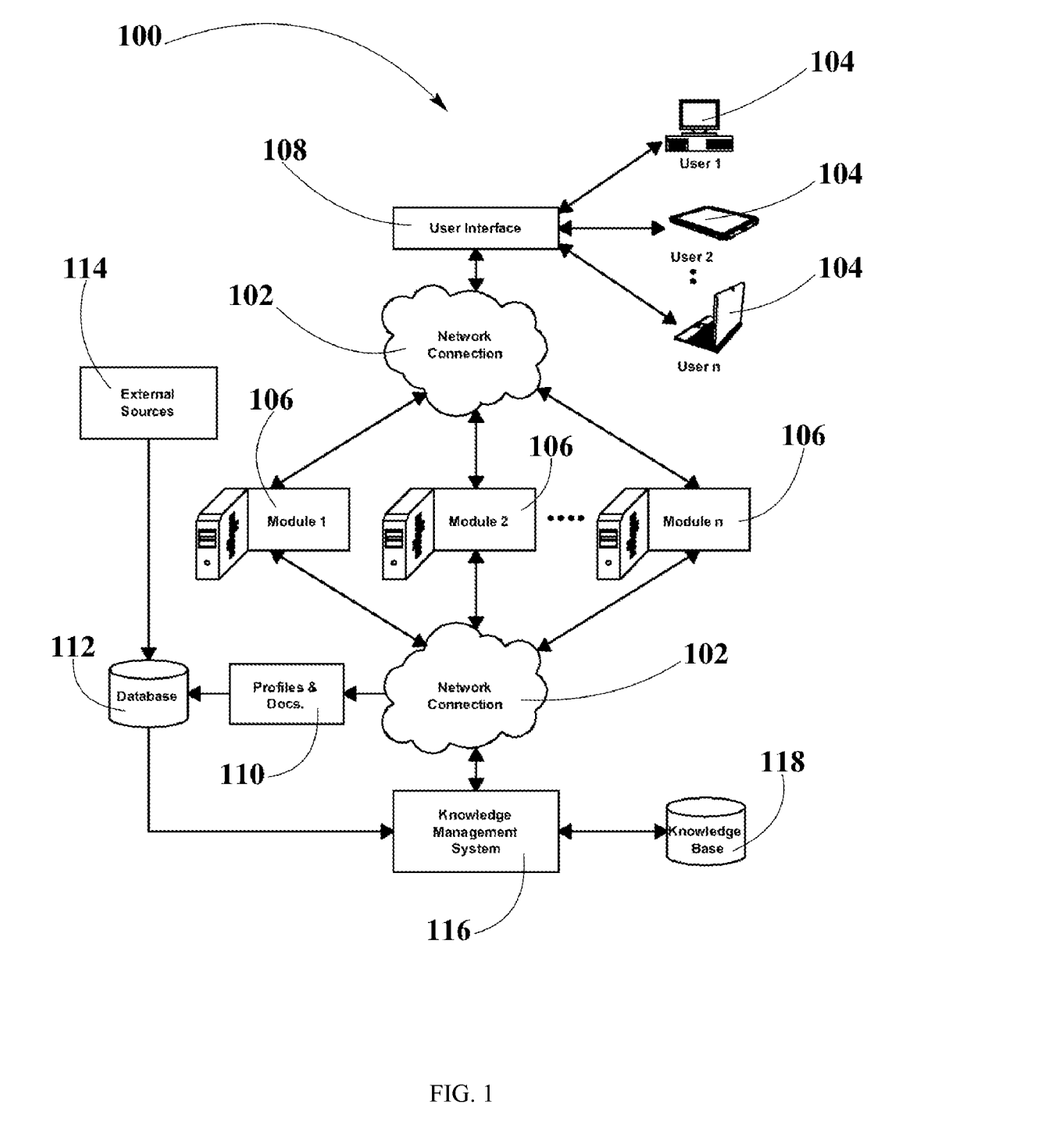
FIG. 1 is a system architecture for a knowledge ecosystem in which one or more embodiments of the present disclosure may operate.

FIG. 1 shows a system architecture 100 for a knowledge ecosystem in which one or more embodiments of the present disclosure may operate.

The knowledge ecosystem described here may enable automated human-to-human collaboration through the use of system architecture 100. The disclosed system architecture 100 may include different components which may dynamically interact with each other through network connections 102. Network connections 102 may refer to any suitable connections between computers such as, for example, intranets, local area networks (LAN), virtual private networks (VPN), wireless area networks (WAN) and the internet among others.

In the knowledge ecosystem, one or more client computing devices 104 may display a graphical user interface 108 configured to receive information from one or more users and interact with one or more software modules 106. Examples of client computing devices 104 may include smartphones, desktop computers, laptop computers, tablets, and PDAs, among others. Software modules 106 may include any software used by key areas of an organization such as, for example, accounting software, human resources software, project management, organizational social networks, search engines and/or any other suitable software from where knowledge of an organization may be derived. In addition, each software module 106 may be executed by a server, a single computer or multiple computers in a distributed configuration.

User interface 108 displayed in client computing devices 104 may exhibit an intelligent feature for not only supporting human-computer interactions but also providing technology supported and socially enabled human-to-human collaboration for co-located and geographically diverse work teams alike. User interface 108 may act as a single portal for accessing different software modules 106 and may be tailored to users depending on the access rights predetermined for those specific users. In another embodiment, an independent user interface 108 may exist for each software module 106.

Interaction between client computing devices 104 and software modules 106 may generate raw data 110 such as user profiles, documents, project information, metrics, emails and worksheets among others. Software modules 106 may transmit raw data 110 through network connection 102 to a database 112 for storing. Database 112 may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

External sources 114 may also feed raw data 110 to database 112. Examples of external sources 114 may include the world wide web, external social networks, external consulting, third party providers, external project sources and/or any external data that may serve to produce knowledge.

Finally, a knowledge management system 116 may manage and process the flow of information within the knowledge ecosystem. For example, knowledge management system 116 may retrieve and process raw data 110 stored in database 112 to consequently derive knowledge from raw data 110. Knowledge may then be stored in a knowledge base 118. Knowledge management system 116 may also pull knowledge from knowledge base 118 when requested by client computing devices 104 or software modules 106.

Knowledge management system 116 may include one or more computers suitable for executing knowledge management software according to embodiments described here. Knowledge base 118 may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

According to an embodiment, one of software modules 106 may be dedicated to manage a collection of artifacts stored in database 112, and its derived knowledge stored in knowledge base 118. As a result, client computing devices 104 may receive from users through graphical user interface 108, requests for storing and/or retrieving one or more sets or subsets of useful artifacts during projects execution. Subsequently, client computing device 104 may transmit the request to software module 106 and then, knowledge management system 116 may process the storing and/or retrieving request.

Figure 2:
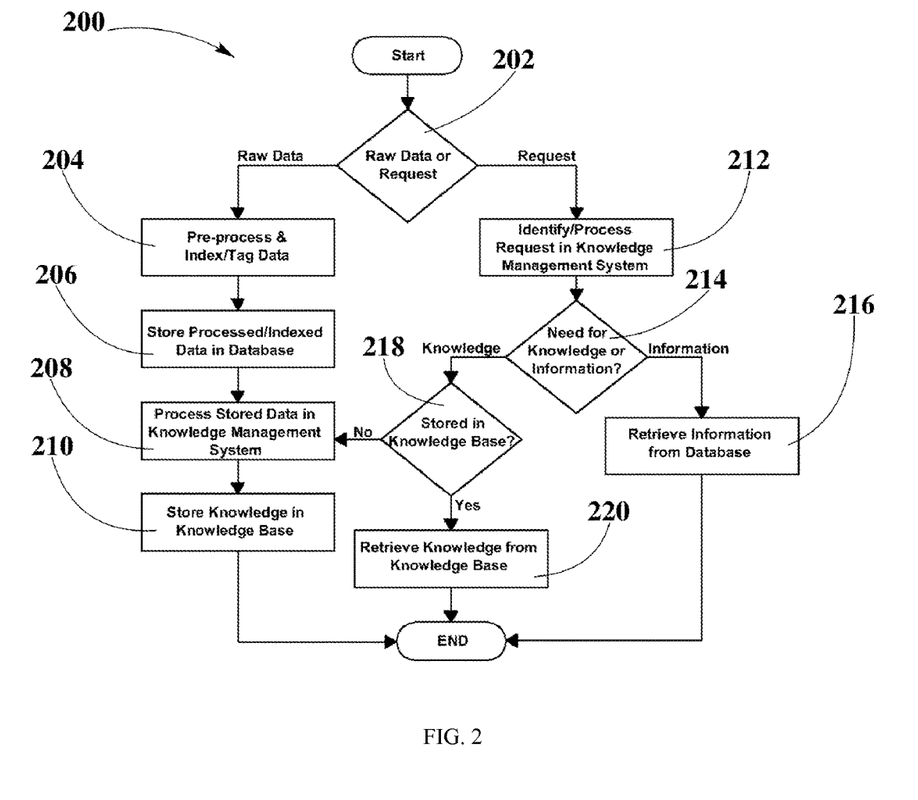
FIG. 2 is a flowchart of input/request management process within a knowledge ecosystem, according to an embodiment.

FIG. 2 is a flowchart of input/request management process 200, according to an embodiment.

The process may start when raw data or requests may be generated from the interaction of one or more client computing devices with one or more software modules within a knowledge ecosystem. Examples of client computing devices may include smartphones, desktop computers, laptop computers, tablets, and PDAs, among others. Software modules may include any software used by key areas of an organization such as, for example, accounting software, human resources software, organizational social networks, project management, search engines and/or any other suitable software from where knowledge of an organization may be derived. In addition, each software module may be executed by a server, a single computer or multiple computers in a distributed configuration.

Raw data may include user profiles, documents, project information, metrics, emails and worksheets, among others. Requests may include the demand for information or knowledge.

Software modules may classify between raw data or requests, at step 202. Subsequently, at step 204, software modules may send raw data to a database where one or more sets of raw data may be analyzed, classified, indexed, and tagged using one or more information processing algorithms designed to process one or more types of data, allowing the conversion of raw data into preprocessed information. In some embodiments, this process may be done using state of the art data mining, and other suitable data processing tools. The database may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

The database may store the preprocessed information at step 206, until a knowledge management system determines that there is a need for analyzing one or more sets of preprocessed information. Knowledge management system may include one or more computers suitable for executing knowledge management software according to embodiments described here.

The need for analyzing one or more sets of preprocessed information may arise from a client computing device generated request or from a software module generated request. If the knowledge management system determines there is a need for new knowledge within the knowledge ecosystem, knowledge management system may analyze one or more sets of preprocessed information according to the identified knowledge needs, at step 208. In some embodiments, knowledge management system may use additional processing tools from one or more software modules during the analysis of preprocessed information.

Following step 208, knowledge management system may analyze and compare one or more sets of processed information against one or more knowledge needs identified within the knowledge ecosystem. Knowledge management system may identify knowledge from the processed information, where this knowledge may be useful for improving the performance of one or more tasks in a project. At step 210, the knowledge management system may store the identified knowledge in a knowledge base and the process may end. In some other embodiments, knowledge management system may store only indexed references or tags of the one or more useful processed information sets or subsets in knowledge base.

Knowledge base may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

At step 212, software modules may send requests to the knowledge management system for analysis. Knowledge management system may classify the requests to determine if there is a need for knowledge or for information, at step 214. In one embodiment, information may refer to facts or details about users, tasks, projects, and general activities within the knowledge ecosystem. In one embodiment, knowledge may refer to information, acquired, processed or derived by client computing devices, software modules, and knowledge management system, where this information may be useful for improving one or more tasks in one or more projects.

Following the process, if there is a need for information, knowledge management system may retrieve the necessary one or more sets or subsets of information from the database, at step 216, and the process may end.

If there is a need for knowledge, knowledge management system may determine if the necessary knowledge to address the identified need is already stored in the knowledge base, at step 218. If the necessary knowledge is already stored in the knowledge base, then knowledge management system may retrieve the required knowledge from the knowledge base, at step 220. If necessary knowledge is not yet stored in the knowledge base, knowledge management system may retrieve and analyze one or more sets of preprocessed data from the database and subsequently store identified knowledge in knowledge base, at step 210, and the process may end.

Figure 3:
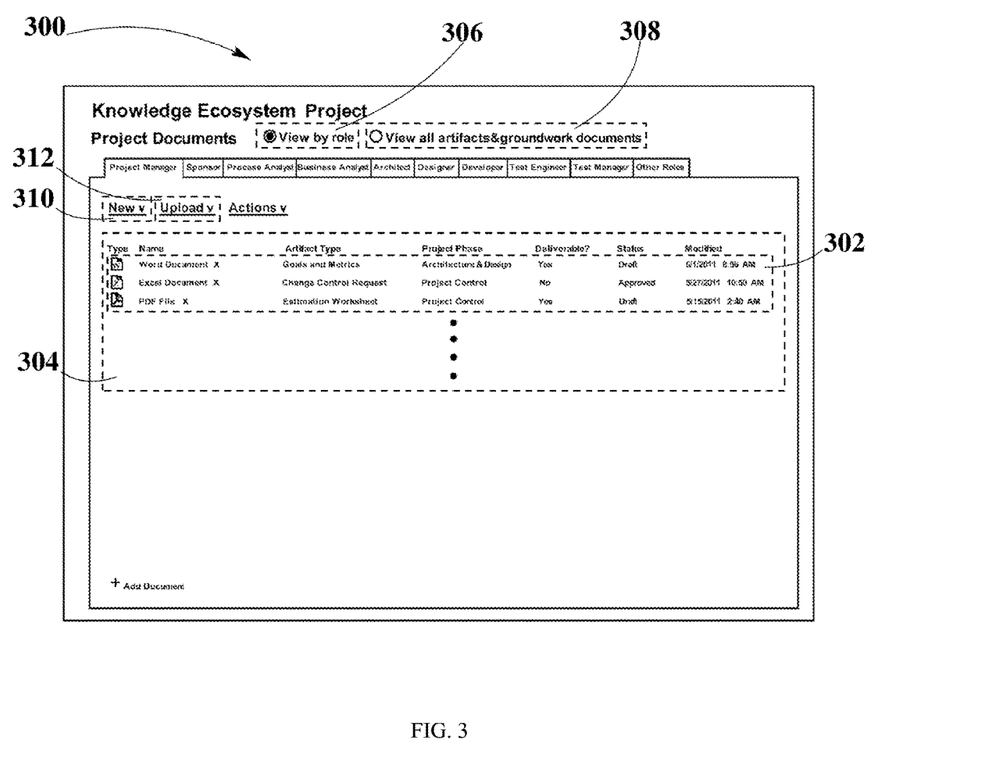
FIG. 3 shows an exemplary project repository interface of a software module dedicated to the management of artifacts within a knowledge ecosystem, according to some embodiments of the present disclosure.

FIG. 3 shows an exemplary project repository interface 300 of a software module dedicated to the management of artifacts within a knowledge ecosystem, according to some embodiments of the present disclosure.

One or more computing devices may display project repository interface 300 which may be configured to receive requests for storing and retrieving information from one or more project participants. Examples of computing devices may include smartphones, desktop computers, laptop computers, tablets, and PDAs, among others. The software module dedicated to the management of artifacts may generate project repository interface 300 and may be executed by a server, a single computer or multiple computers in a distributed configuration.

Project repository interface 300 may show through a computing device, a table 304 listing each artifact 302 retrieved for a specific project within an organization. The knowledge management system may retrieve one or more artifacts 302 from a database, according to its associated knowledge stored in a knowledge base, and according to the project requirements. The database and the knowledge base may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data. Table 304 may include information concerning each artifact 302 such as, type of file, name, category type, project phase to which artifact 302 may be associated, whether artifact 302 may correspond to a deliverable content for the project, the status of artifact 302 in the project repository, and the date of the last modification made to artifact 302 in the project repository.

The computing device may display project repository interface 300 to every project participant, showing every artifact 302 retrieved for the project. Artifacts 302 may be displayed in two or more suitable filtering classifications, such as role 306 of each project participant as shown in FIG. 3, and all project deliverables and project groundwork documents 308, which may facilitate the selection, modification, and implementation of suitable artifacts 302 according to the project requirements. Project repository interface 300 may also display for every project participant, a suitable option to retrieve 310 artifacts 302 from the database according to its associated knowledge in the knowledge base. Project repository interface 300 may also display a suitable option to upload 312 a new artifact 302 to the database and subsequently to the knowledge base.

Figure 4:
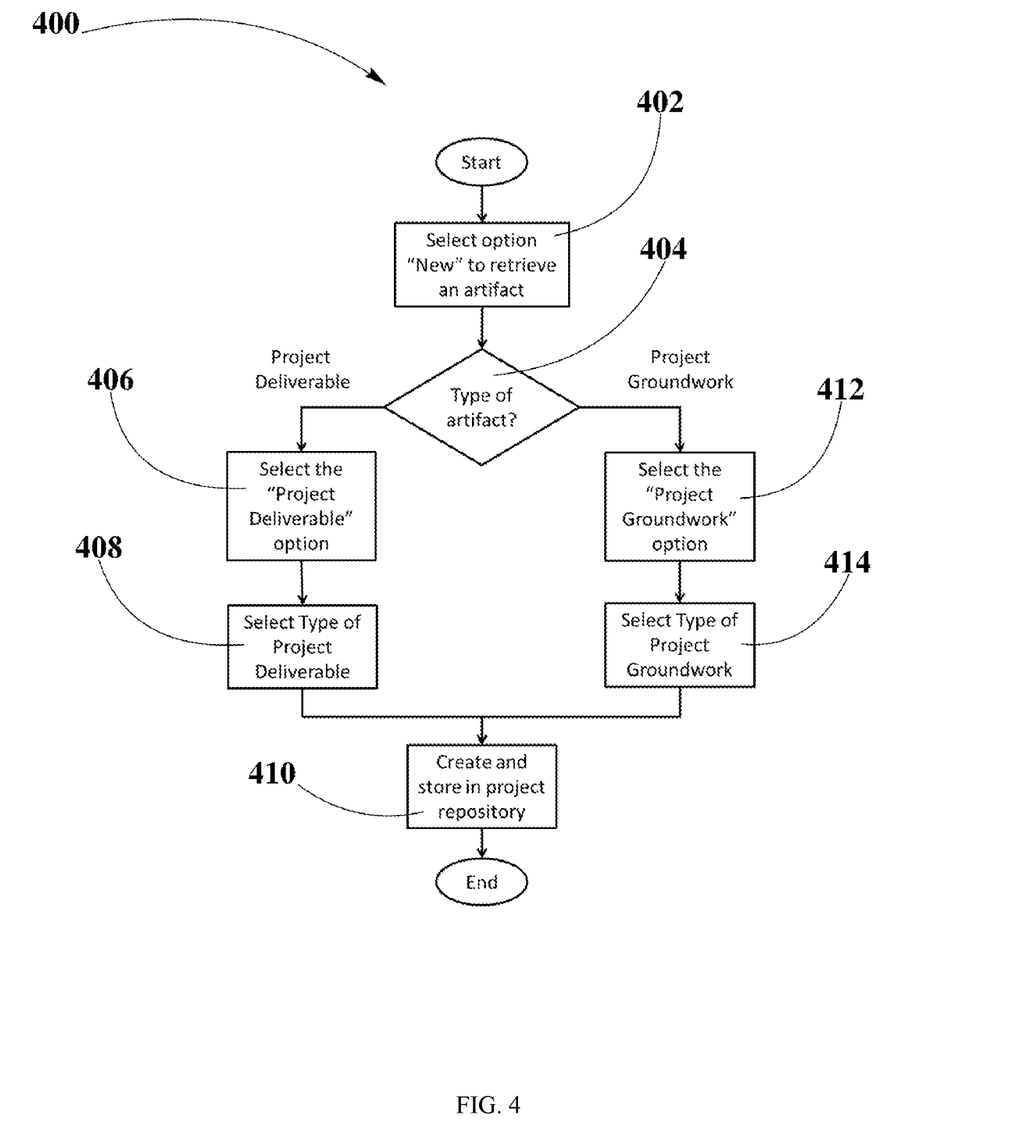
FIG. 4 is a flow chart of the process for retrieving an artifact to implement in a specific project, according to another embodiment.

FIG. 4 is a flow chart of a process for retrieving an artifact 400 to implement in a specific project, according to another embodiment.

One or more computing devices may display a project repository interface of a software module dedicated to the management of artifacts within a knowledge ecosystem. Examples of computing devices may include smartphones, desktop computers, laptop computers, tablets, and PDAs, among others. In addition, the software module may be executed by a server, a single computer or multiple computers in a distributed configuration.

The project repository interface may be configured to receive requests for retrieving one or more artifacts from one or more project participants, through their interaction with a computing device. The project repository interface may also display a copy of all these artifacts retrieved. The collection of all available artifacts which may be retrieved for one or more projects' execution may be stored in a database, and the derived knowledge from each artifact in the database may be stored in a knowledge base.

The database and the knowledge base may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

The software module may generate an intelligent and dynamic user interface which may be displayed through the computing device to one or more project participants. This user interface may guide the project participant through a series of steps which may facilitate the selection of one or more artifacts from the knowledge base, according the project requirements.

Process for retrieving an artifact 400 from the database according to its associated knowledge in the knowledge base may start at step 402, when a project participant may select the option "New" through the interaction with a computing device displaying the project repository interface. For example, the user interface may present this or other options as a hyperlink, dropdown menu, button, radio button, or other clickable or selectable item.

The selection of an appropriate artifact may begin at step 404, when the project participant may choose by interacting with his computing device displaying the user interface, a suitable type of artifact according to categories such as project deliverable or project groundwork.

Project deliverables may be any piece of documentation that may be created and provided as a result of the completion of one or more stages of a specific project, such as, business requirements, test plan, test case, project charter, and project scope document, among others. Project groundworks may be any piece of documentation created to support the analysis and thinking during projects execution, such as, spreadsheets, diagrams and questionnaires, among others. Project groundworks may lead to a deliverable document, but may not be a deliverable document itself.

If there is a need for the retrieval of project deliverables, then at step 406, the project participant may select a project deliverable option.

At step 408, the project participant may select a type of project deliverable from an available list of templates.

At step 410, the project participant may select a create option so that the user interface may generate in the software module a request for the retrieval of one or more project deliverables.

Similarly, if there is a need for the retrieval of project groundworks, then at step 412 the project participant may select a project groundwork option through the interaction with the computing device displaying the project repository interface. Subsequently, at step 414, the project participant may select a type of project groundwork from an available list of templates, and finally, at step 410, the project participant may select the create option so that the user interface may generate in the software module a request for the retrieval of one or more project groundworks.

In yet another embodiment, the knowledge base may include knowledge derived from reference documents as a third category of artifacts. Reference documents may describe suitable approaches to implement and manage one or more artifacts according to the knowledge that may be required for a specific project execution. One or more reference documents may be retrieved for a project execution as needed by one or more project participants.

In a further embodiment, artifacts may be retrieved using one or more tags associated to the attributes of those artifacts matching the project requirements. Tags may be various text labels assigned values that may be user-defined or system-defined and may be stored in the knowledge base. One or more project participants may perform a retrieval request by using a suitable search engine and defining one or more tags which may be associated to the attributes of one or more artifacts that may satisfy the project requirements.

Software module may receive the retrieval request from the interaction of the project participant with the computing device displaying the user interface, and then software module may transmit the retrieval request to the knowledge management system.

The knowledge management system may process the information derived from the retrieval request to identify the artifacts from the database whose associated knowledge stored in the knowledge base may match the requirements of the project defined by the project participant. The knowledge management system may use state of the art data mining, and other suitable data processing tools to perform the processing of information. As a result, only suitable artifacts may be retrieved and implemented on each project execution.

Once the knowledge management system retrieves the appropriate artifact for a specific project, the process may end and the artifact may be stored in the project repository. The computing device may display the project repository interface, which may show all the retrieved artifacts to every project participant.

Figure 5:
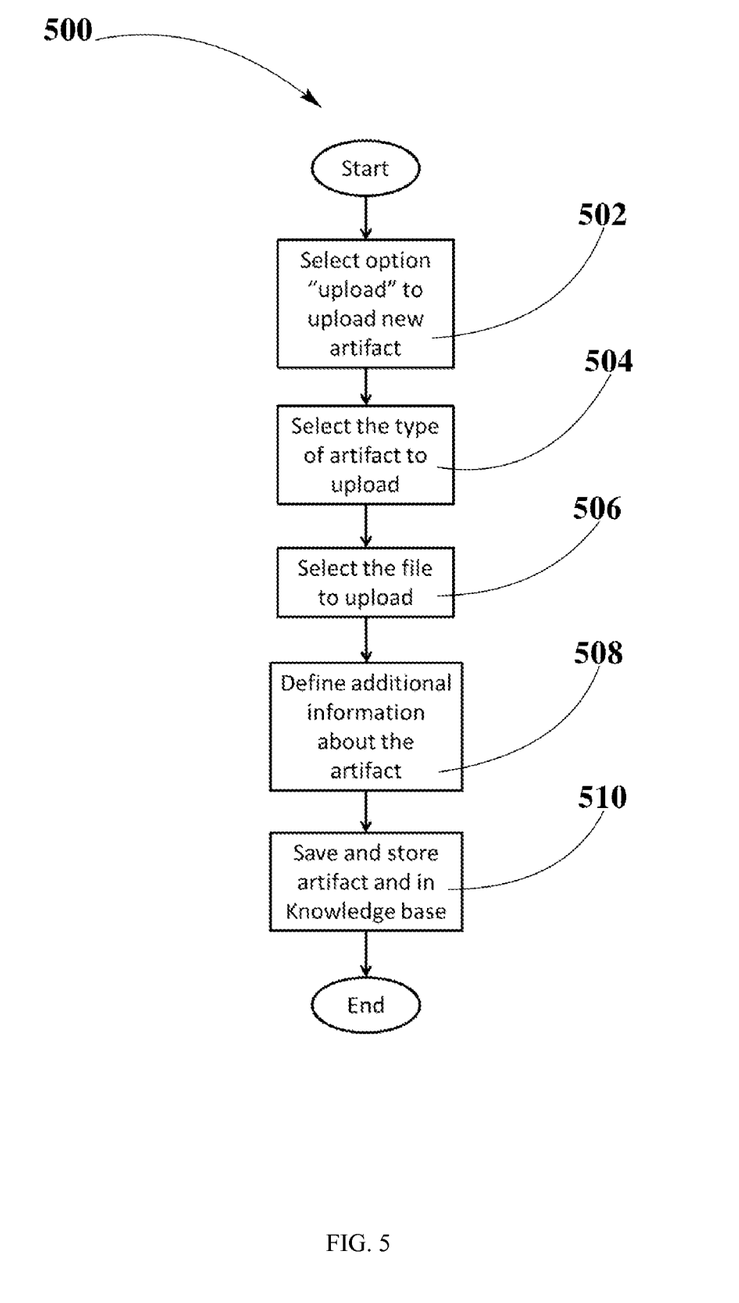
FIG. 5 is a flow chart of the process for storing a new artifact in a database and subsequently a knowledge base, according to a further embodiment.

FIG. 5 is a flow chart of a process for storing a new artifact 500 in a database and subsequently in a knowledge base, according to a further embodiment.

One or more computing devices may display a project repository interface of a software module dedicated to the management of artifacts within a knowledge ecosystem. Examples of client computing devices may include smartphones, desktop computers, laptop computers, tablets, and PDAs, among others. In addition, the software module may be executed by a server, a single computer or multiple computers in a distributed configuration.

The project repository interface may be configured to receive requests for uploading one or more artifacts from one or more project participants, through their interaction with a computing device. The option to upload an artifact may be suitable when one or more project participants may create a new artifact or a new version of an already stored artifact during the execution of a project, due to the lack of suitable artifacts in the database to implement in a specific project, according to the knowledge associated to each artifact which may be stored in the knowledge base. The database and the knowledge base may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

The software module may generate an intelligent and dynamic user interface which may be displayed through the computing device to one or more project participants. This user interface may guide the project participant through a series of steps which may facilitate the uploading of one or more artifacts to the database and subsequently to the knowledge base.

Process for storing a new artifact 500 in the database and subsequently in the knowledge base, may start at step 502 when a project participant may select the option to upload a new artifact file, by interacting with the computing device displaying the project repository interface.

Then, at step 504, the project participant may need to select a suitable category for the type of artifact being uploaded, according to a type of project deliverable, project groundwork, reference document or any other suitable type of pre-defined artifacts category, in order to facilitate the later retrieval of suitable artifacts according to the project requirements.

Project deliverables may be documents created and provided as a result of the completion of one or more relevant stages of the project; project groundworks may be documents created to support the analysis and thinking during projects execution, which may lead to a deliverable document, but is not a deliverable itself; and reference documents may describe suitable approaches to implement and manage one or more artifacts.

In a subsequent step, the project participant may define the artifact file location at step 506, and additional information concerning the artifact at step 508. Additional information concerning the artifact may include content type, file name, project name, artifact title which may be shown as the name of the artifact on the project repository interface, phrases that may be associated with the artifact content and whether the artifact may correspond to a deliverable content for a specific project.

At the end of the process, at step 510, the project participant may select the option to save the new artifact in the database and subsequently in the knowledge base.

At step 510, the project repository interface may generate in the software module a request for uploading one or more artifacts.

Software module may receive the upload request from the interaction of the project participant with the computing device displaying the user interface, and then software module may transmit the request to the knowledge management system. The knowledge management system may process the information derived from the upload request, and may store the raw data in the database and its derived knowledge in the knowledge base.

The artifact's knowledge stored in the knowledge base may include different attributes associated to one or more categories, tags, and/or any additional information concerning the artifact defined at step 508, including the expertise of the project participants who created the artifact.

Components of the exemplary methods and systems may be performed automatically or simultaneously. These methods and system can improve the operational efficiency of the knowledge management system. In one embodiment, a computer-implemented method comprises receiving, by a computer, from a client device a request to store a new artifact and the new artifact from a client device; categorizing, by the computer, the new artifact according to a selection of artifact in the upload request; associating, by the computer, additional information defined in the upload request with the new artifact; storing, by the computer, the new artifact into an artifact database storing one or more artifacts; automatically associating, by the computer, the new artifact with one or more attributes according to additional information; automatically associating, by the computer, the one or more attributes with one or more tags; upon automatically associating the one or more attributes, deriving, by the computer, knowledge from the new artifact using the one or more tags, the one or more attributes, and the additional information; and storing, by the computer, the knowledge derived from the new artifact in a knowledge base.

In another embodiment, a computer-implemented method comprises receiving, by a computer, from a client device a request to retrieve an artifact related to a project stored in a database, wherein the request comprises a list of one or more attributes associated with the artifact; identifying, by the computer, a set of candidate artifacts stored in the database satisfying the retrieval request; upon identifying the set of candidate artifacts, identifying, by the computer, from the one or more candidate artifacts a set of one or more matching artifacts associated with knowledge related to the project; and storing, by the computer, the set of artifacts in a project repository that is associated with the project.

In yet another embodiment, a computer-implemented method comprises storing, by the computer, a new artifact in a database storing one or more artifacts, wherein the new artifact is associated with knowledge; receiving, by the computer, one or more quality evaluations for the new artifact, wherein a quality evaluation evaluates the knowledge associated with the new artifact; calculating, by the computer, a quality score for the new artifact using the one or more quality evaluations; and automatically ranking, by the computer, each of the one or more artifacts stored in the database based on the quality score associated with each of the artifacts.

In still another embodiment, a system comprises an artifact database storing one or more artifacts associated with one or more artifact attributes, wherein the one or more artifact attributes are each associated with a tag; a knowledge base storing knowledge associated with each of the one or more artifacts; a project repository storing one or more projects implementing a set of artifacts that are related to a project; a management processor operating a project repository interface and configured to receive a request from a project repository interface; and a client device interacting with the project repository interface.

The exemplary embodiments described herein are directed to improving the efficiency of processing knowledge information. The systems and methods use a specially-programmed computer system that has the capability to perform the complex computations and automated functionality that cannot be reasonably performed by a person. The computations and functionality are envisioned to be performed by a non-human system, including hardware, software, and/or firmware. The computations and functionality cannot be performed by a generic computer, but rather a specially-programmed computer that is configured to perform the complex computations and functionality described herein. The techniques and processes described herein may also improve the efficiency of the specially-programmed computer by performing discrete tasks that can more optimally process data.

Tags may be various text labels assigned values that may be user-defined or system-defined at any time as needed. These tags may be assigned selectively by a member within the organization using controlled vocabulary or any other suitable terminology which may enable the vocabulary to evolve organically. The tags may also be automatically assigned by the knowledge management system according to one or more words that are currently being used to tag other artifacts and that may also match the new artifact's attributes, such as by using suitable semantic analysis techniques.

The knowledge management system may use state of the art data mining, and other suitable data processing tools to perform the processing of information. As a result, each artifact may represent different knowledge to the project participant and the project participant may be directed to it when the artifact's knowledge matches the project requirements.

In yet another embodiment, the method for the management of artifacts may also include a process for the assignation of policies concerning the retention time of a specific version of an artifact in the database and its associated knowledge in the knowledge base. This retention policy may be consistent with the organization's rule to retain their documents, for example, some artifacts may be kept in the database and knowledge base for at least 7 years, while others may be retained forever.

The retention policy associated to an artifact may also depend to some extent, on the quality rank associated to each artifact, which may correspond to the quality score of the knowledge that each artifact presents to the project participants.

Each quality score may be generated from the evaluation of one or more members within the organization. These reviews may be presented in the project repository interface to one or more project participants, in a numerical, textual, pictorial, auditory, or tactile way. For example, a member may evaluate an artifact in a scale of 1, 2, 3, 4, or 5 stars, with 1 star being the lowest rating, and 5 stars being the highest rating, by interacting with a computing device displaying the project repository interface.

Another example of an artifact evaluation may involve choosing a picture of thumbs up whenever the project participant characterizes the artifact as relevant. Another example may include a member operating an application on a mobile device, and dragging pictorial representations of artifacts into different groups or piles categorized as "Relevant" or "Outdated" as needed. The quality score may also include an "Exemplar" tag, whenever one or more members within the organization may have characterized an artifact as highly relevant, therefore validating the artifact at a higher level in terms of quality.

As a result, the method for the management of artifacts may allow matching the project requirements with a suitable version of an artifact on each project.

Example #1 is an example of the operation of a project repository interface. A project manager may access all the retrieved artifacts of a specific project by interacting with his laptop which may display the project repository interface. Whenever the project manager modifies an artifact according to the project requirements, such modified artifact may be displayed to the process analyst and the business analyst through the project repository interface on their laptops, which may facilitate the collaborative work.

The project manager may choose to review all the retrieved artifacts on the project repository interface, by role of the project participant who retrieved each artifact as show in FIG. 3. Similarly, the project manager may choose to review all the retrieved artifacts in a single list, which may facilitate the process of finding a specific artifact, whenever the project manager may lack the information of the participant's role that retrieved the requested artifact.

Example #2 is an example of the execution of the process for retrieving an artifact shown in FIG. 4. The project manager of a specific project may need to retrieve an artifact to define the goals and metrics for the architecture and design phase of a project. The project manager may select the option new in the project repository interface displayed on his laptop. Then, the project manager may select the project deliverable option and the type of artifact template which may correspond to the goals and metrics of a project, from an available list of artifacts. Finally the project participant may select the option create, in order to store the artifact in the project repository and be able to modify it according to the project requirements. The list of available artifacts may include different versions of an artifact based on newly created knowledge, therefore, the project manager may find one or more suitable options for each type of artifact, as a result, the selection of an appropriate artifact may be based on the quality rank or on the tags and categories associated to each artifact.

Example #3 is an example of the execution of the process for storing a new artifact shown in FIG. 5. The project manager of a specific project may have developed in collaboration with the project analyst and the business analyst, a new version of the goals and metrics artifact template stored in the database. In order to foster the creation of knowledge, the newly developed artifact may be made available to future project efforts by storing a copy of the new artifact template in the database and subsequently in the knowledge base.

To store the new version of the goals and metrics artifact template, the project manager may select the upload option on the project repository interface through the interaction with his laptop. Then, the project manager may select the project deliverable option as the type of artifact to be uploaded. Next, the project manager may define the file location and additional information before he selects the option to save and store the artifact's template in the database and subsequently in the knowledge base. In order to highlight the knowledge which the new artifact presents to the project participants, the project manager may define a suitable quality rank, categories, and tags, to the artifact, in order to facilitate its future retrieval.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A computer-implemented method comprising:
   receiving, by a computer from a first client device, an upload request from a user to store a first electronic document and further receiving the first electronic document from the first client device,
      wherein the upload request further comprises additional information regarding the first electronic document;
   categorizing, by the computer, the first electronic document according to a selection on a graphical user interface of the first client device of a category type of the first electronic document in the upload request;
   associating, by the computer, additional information received from the upload request with the first electronic document;
   storing, by the computer, the first electronic document into an electronic document database storing one or more electronic documents;
   automatically associating, by the computer, the first electronic document with a set of user attributes corresponding to the user identified in the additional information;
   upon automatically associating the set of user attributes, deriving, by the computer, knowledge from the first electronic document by retrieving and processing raw data in the first electronic document using data mining techniques and tagging and indexing the first electronic document based on the set of the user attributes and the additional information;
   storing, by the computer, the knowledge derived from the first electronic document in a knowledge database, wherein the knowledge database stores the knowledge comprising tags and references associated with the set of user attributes;
   receiving, by the computer, via a search engine from a second client device, a request for a second electronic document from the electronic document database, wherein the request comprises a set of search attributes corresponding with the second electronic document;
   upon identifying, from the electronic document database, a third electronic document corresponding to the set of search attributes, identifying, by the computer from the knowledge database, knowledge corresponding to the set of search attributes and at least a fourth electronic document that corresponds to the knowledge corresponding to the set of search attributes; and
   displaying, by the computer, the third and fourth electronic documents on the second client device.

2. The method according to claim 1, wherein the first electronic document category type is selected from the group consisting of: a new version of an existing electronic document, a project deliverable, a project groundwork, and a reference document.

3. The method according to claim 1, wherein the additional information is selected from the group consisting of: content type, file name, project name, electronic document title, one or more phrases associated with the first electronic document, one or more related deliverables, and one or more related projects.

4. The method according to claim 1, further comprising:
identifying, by the computer, one or more existing tags associated with one or more attributes associated with the first electronic document stored in the database; and
automatically associating, by the computer, the one or more existing tags matching the one or more attributes associated with the first electronic document.

5. The method according to claim 4, wherein automatically associating comprises applying, by the computer, a semantic analysis.

6. The method according to claim 1, further comprising:
associating, by the computer, one or more tags received from the first client device with the one or more attributes associated with the first electronic document according to an input at a user interface.

7. The method according to claim 1, further comprising:
identifying, by the computer, a lack of electronic documents stored in the database to implement in a related project according to the knowledge associated with each of the electronic documents that is stored in the knowledge base, and wherein the computer accepts the first electronic document when there is a lack of electronic documents.

8. The method according to claim 1, further comprising:
recommending, by the computer, the fourth electronic document to a project participant assigned to a project when the knowledge associated with the fourth electronic document matches one or more project requirements that are associated with the project.

9. The method according to claim 1, further comprising:
calculating, by the computer, a quality score associated with the fourth electronic document, wherein the quality score evaluates the quality of the knowledge associated with the fourth electronic document.

10. The method according to claim 9, further comprising:
ranking, by the computer, one or more quality scores associated with each of the electronic documents stored in the database.

11. The method according to claim 1, further comprising:
assigning, by the computer, an electronic document retention policy to the first electronic document based on one or more retention policy rules.

12. The method according to claim 1, further comprising:
storing, by the computer, at least one of the third and fourth electronic documents in a project repository that is associated with a project.

13. The method according to claim 1, wherein the request for the second electronic document comprises a selection of category type of the electronic document, wherein the category type is selected from the group consisting of: deliverable, groundwork, and reference.

14. The method according to claim 1, wherein the request for the second electronic document comprises a selection of an electronic document template type.

15. The method according to claim 1, further comprising:
matching, by the computer, one or more search terms in the request for the second electronic document with one or more tags associated with a set of candidate electronic documents stored in the database.

16. The method according to claim 12, further comprising:
receiving, by the computer, one or more quality evaluations for at least one of the first, second, third, and fourth electronic documents, wherein a quality evaluation evaluates the knowledge associated with the each of the electronic documents;
calculating, by the computer, a quality score for each of the electronic documents using the one or more quality evaluations; and
automatically ranking, by the computer, each of the one or more electronic documents stored in the database based on the quality score associated with each of the electronic documents.

17. The method according to claim 16, further comprising:
assigning, by the computer, a retention policy to an electronic document based on a quality rank resulting from ranking each of the quality scores.

18. The method according to claim 16, further comprising:
polling, by the computer, one or more project participants for a quality evaluation corresponding to at least one of the first, second, third, and fourth electronic documents.

19. A system comprising:
an electronic document database storing one or more electronic documents associated with a set of user attributes;
a knowledge database storing knowledge associated with each of the one or more electronic documents;
a project repository storing one or more projects implementing a set of electronic documents that are related to a project;
a management processor operating a project repository interface and configured to receive a request from the project repository interface; and
a first client device and a second client device interacting with the project repository interface;
wherein the management processor is configured to:
receive, from the first client device, an upload request from a user to store a first electronic document and further receive the first electronic document from the first client device, wherein the upload request further comprises additional information regarding the first electronic document;
categorize the first electronic document according to a selection on a graphical user interface of the first client device of a category type of the first electronic document in the upload request;
associate additional information received from the upload request with the first electronic document;
store the first electronic document into the electronic document database storing one or more electronic documents;
automatically associate the first electronic document with the set of user attributes corresponding to the user identified in the additional information;
upon automatically associating the set of user attributes, derive knowledge from the first electronic document by retrieving and processing raw data in the first electronic document using data mining techniques and tagging and indexing the first electronic document based on the set of the user attributes and the additional information;

store the knowledge derived from the first electronic document in the knowledge database, wherein the knowledge database stores the knowledge comprising tags and references associated with the set of user attributes;

receive via a search engine from the second client device, a request for a second electronic document from the electronic document database, wherein the request comprises a set of search attributes corresponding with the second electronic document;

upon identifying, from the electronic document database, a third electronic document corresponding to the set of search attributes, identify from the knowledge database, knowledge corresponding to the set of search attributes and at least a fourth electronic document that corresponds to the knowledge corresponding to the set of search attributes; and display the third and fourth electronic documents on the second client device.

20. The system according to claim 19, wherein the management processor is further configured to automatically generate a list of each of the electronic documents associated with the project according to the request for the second electronic document from the second client device.

21. The system according to claim 19, wherein
the management processor retrieves an available electronic document from the electronic document database based on associated knowledge stored in the knowledge database matching the request for the second electronic document.

22. The system according to claim 20, wherein
the management processor retrieves the available electronic document from the electronic document database based on one or more project requirements associated with the project stored in the project repository.

23. The system according to claim 22, wherein
the project repository stores the available electronic document and updates the project repository interface when one or more new electronic documents are implemented in the project.

24. The system according to claim 23, wherein the management processor associates one or more tags with a new electronic document uploaded from the first client device according to a participant input, and wherein the electronic document database stores the new electronic document in the database and is associated with knowledge in the knowledge database on the tags.

25. The system according to claim 23, wherein the management processor identifies one or more existing tags used to identify the set of user attributes, wherein the management processor automatically associates the one or more existing tags with a new electronic document uploaded from the first client device when the one or more existing tags are associated with the set of user attributes matching the one or more attributes associated with the new electronic document, and wherein the electronic document database stores the new electronic document in the database and is associated with knowledge in the knowledge database on the tags.

26. The system according to claim 23, further comprising:
a knowledge base processor assigning a retention policy and a quality rank to the knowledge associated with each electronic document based on the project requirements and configured to remove outdated data based on the retention policy.

\* \* \* \* \*